UNITED STATES PATENT OFFICE.

PAUL BOËRCHE, OF LONDON, ENGLAND.

INSULATING LACQUER AND MATERIAL.

No. 842,615.   Specification of Letters Patent.   Patented Jan. 29, 1907.

Application filed March 26, 1906. Serial No. 307,990.

*To all whom it may concern:*

Be it known that I, PAUL BOËRCHE, a citizen of the Republic of France, residing in London, N., England, have invented certain new and useful Improvements in Insulating Lacquer and Material; and I do hereby declare the following to be a full, clear, and exact description of the invention, such as will enable others skilled in the art to which it appertains to make and use the same.

This invention relates to an improved insulating-lacquer for the coating of wire, sheets, and other metal surfaces, either for the purpose of protecting such surfaces against dampness or other chemical action or and more especially for insulating electrical wires, cables, molded pieces, and the like, thus taking the place of the more expensive rubber, silk, and similar insulating-coverings. I am using for this purpose a residue obtained in candle manufactories from the distillation of stearin and known to commerce as "stearin-pitch," which normally is soft and can be easily dissolved and melted, showing adhesive properties. I have, however, ascertained that this material when exposed to a temperature above 220° centigrade changes its nature and hardens into an insulating-lacquer which can neither be melted nor dissolved. I can use this material either by itself or together with resinous substances, linseed-oil, oil of turpentine, asphalt, litharge, and other substances, according to the special application it is intended for. In the first case the stearin-pitch may be solved in benzol or other suitable solvent, and when mechanically freed from impurities by filtering or the like this solution may be used for covering metal surfaces which are afterward exposed to a temperature between 225° and 285° centigrade, avoiding overheating, which renders the lacquer brittle. During this heating the solvent evaporates, leaving a uniform covering of insulating-lacquer on the metal surface. The coated surfaces after immersion in the solution may be moved vertically upward between radiators or other heating-surfaces, the temperature of which may increase, attaining its maximum at the upper end, and in this way the flowing back of surplus solution and the evaporation of the solvent will be greatly assisted. I may obtain the heat from any source whatever, and in some cases an electric current with suitable resistances may be passed through the metal—for instance, a wire—to rapidly perform the drying.

Obviously the thickness of the desired coating may be varied, according to the desired purpose or degree of thickness, by thickening the solution or by repeatedly coating or by more rapidly drying, &c. The solution also may be painted on with a brush, or the stearin-pitch may be used in a semi-liquid or viscous state, or articles—for instance, for electrical use as a substitute for ebonite, vulcanized rubber, &c.—may be entirely made from stearin-pitch and then exposed to a temperature of 220° to 285° centigrade.

What I claim is—

1. The process of converting soft stearin-pitch into insoluble and unmeltable material having insulating properties which consists in heating the stearin-pitch to a temperature above, approximately, 220° centigrade, substantially as described.

2. The process of converting soft stearin-pitch into insoluble and unmeltable material having insulating properties which consists in heating the stearin-pitch to a temperature between, approximately, 220° centigrade and, approximately, 285° centigrade, substantially as described.

3. The process of forming an insulating-coating on surfaces to be insulated consisting in applying thereto a coating of stearin-pitch and thereupon heating the coating to a temperature above, approximately, 220° centigrade, substantially as described.

4. The process of forming an insulating-coating on surfaces to be insulated consisting in first dissolving stearin-pitch and then applying to the surface a coating of the dissolved stearin-pitch, and thereupon heating the coating to a temperature above, approximately, 220°, substantially as described.

5. The process of forming an insulating-coating on bodies to be insulated consisting of applying thereto a coating of stearin-pitch and thereupon exposing the thus-coated body to a temperature above, approximately, 220° centigrade, substantially as described.

6. The process of forming an insulating-coating on bodies to be insulated consisting in immersing the same in a bath of stearin-pitch and then moving the body so coated vertically near a source of heat having a temperature above, approximately, 220° centigrade, substantially as described.

In testimony that I claim the foregoing I have hereunto set my hand this 10th day of March, 1906.

PAUL BOËRCHE.

Witnesses:
GASTON FAVIER,
H. D. JAMESON.